(12) United States Patent
Hrastnik

(10) Patent No.: US 12,182,610 B2
(45) Date of Patent: Dec. 31, 2024

(54) PROCESSING PIPELINE ARRANGEMENT FOR ENTERPRISE RESOURCE PLANNING SOFTWARE APPLICATION

(71) Applicant: SAP SE, Walldorf (DE)

(72) Inventor: Jan Hrastnik, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/115,394

(22) Filed: Feb. 28, 2023

(65) Prior Publication Data

US 2024/0289162 A1    Aug. 29, 2024

(51) Int. Cl.
*G06F 7/00* (2006.01)
*G06F 9/46* (2006.01)
*G06F 16/23* (2019.01)
*G06F 17/00* (2019.01)

(52) U.S. Cl.
CPC .......... *G06F 9/466* (2013.01); *G06F 16/2365* (2019.01)

(58) Field of Classification Search
None
See application file for complete search history.

(56) References Cited

U.S. PATENT DOCUMENTS

2017/0109165 A1* 4/2017 Batley ................. G06F 9/30145
2020/0327104 A1* 10/2020 Anand .................... G06Q 20/16
2021/0124746 A1* 4/2021 Klaedtke ........... G06F 16/24556

* cited by examiner

*Primary Examiner* — Tuan A Pham
(74) *Attorney, Agent, or Firm* — SCHWEGMAN LUNDBERG & WOESSNER, P.A.

(57) ABSTRACT

Various examples are directed to systems and methods for performing data object operations in an enterprise resource planning (ERP) application. The ERP application may receive an instruction to perform a transaction associated with a data object stored at a database management system. The ERP application may initiate execution of a transaction manager that is to manage a transaction stream buffer. A first processing pipeline may be executed for the transaction. The first processing pipeline may execute a first processing unit, where the executing of the first processing unit comprises accessing first processing unit input data from a transaction stream buffer and writing first processing unit output data to the transaction stream buffer. The transaction manager may initiate a save process to write the first processing unit output data to the data object stored at the database management system.

20 Claims, 14 Drawing Sheets

PROCESSING PIPELINE ARRANGEMENT FOR ENTERPRISE RESOURCE PLANNING SOFTWARE APPLICATION

BACKGROUND

Databases are used in many different computer processing environments to store data, often in a structured and easily-accessible way. Many databases are managed by database management systems that execute database operations received from users.

BRIEF DESCRIPTION OF DRAWINGS

The present disclosure is illustrated by way of example and not limitation in the following figures.

DETAILED DESCRIPTION

Figure 1:
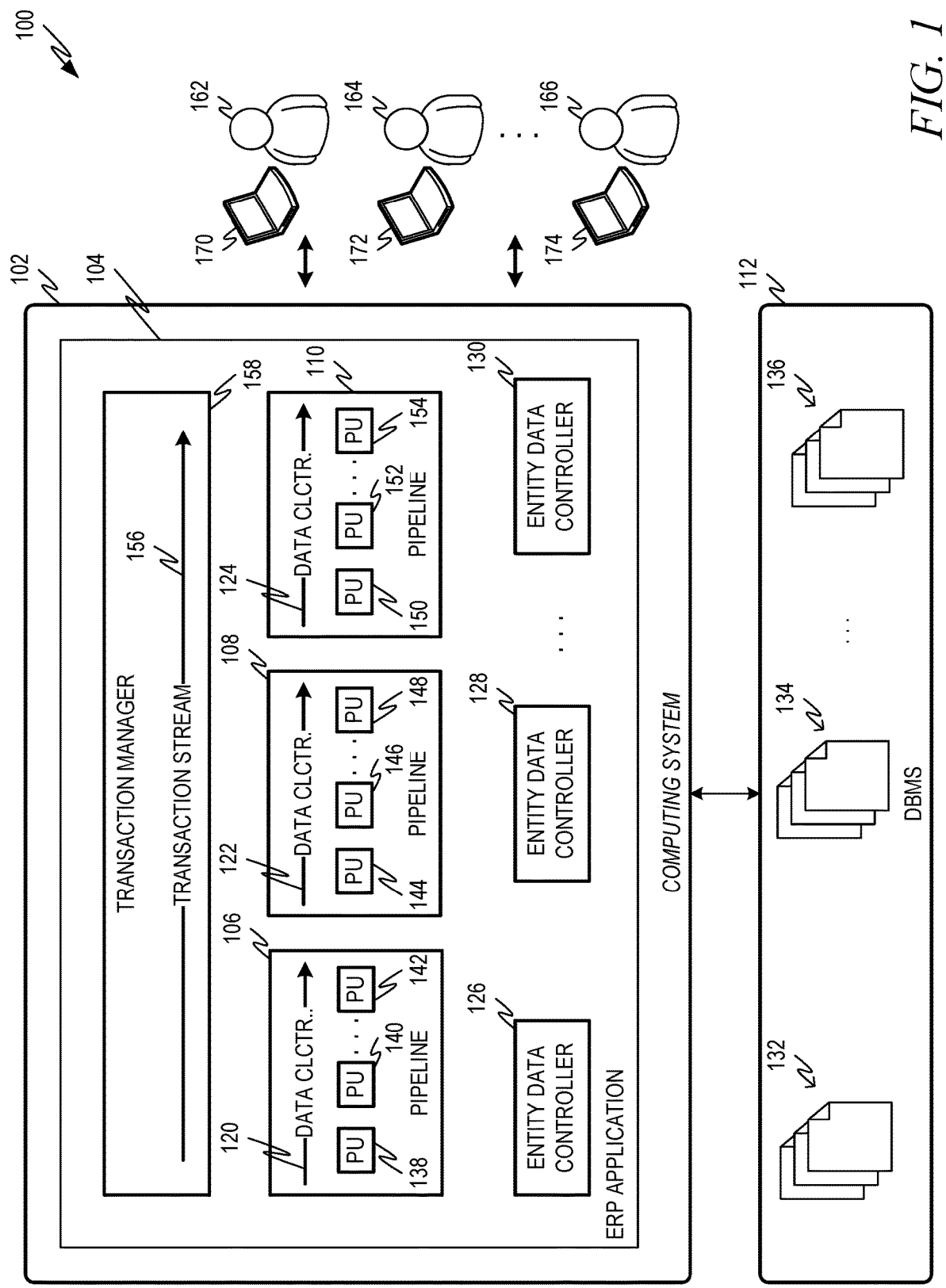
FIG. 1 is a diagram showing one example of an environment for executing an enterprise resource planning (ERP) application.

A database management system (DBMS) can be implemented as part of a suite of software applications that execute together. For example, the DBMS may support various client processes that utilize the DBMS to manage data. In some examples, a DBMS is implemented with a suite of processes that implement an enterprise resource planning (ERP) software application. ERP applications are often used in conjunction with a DBMS to manage various different aspects of business operations. An example ERP software application is the S/4 HANA product available from SAP SE of Waldorf, Germany.

The ERP application generates and utilizes the data stored at the database management system to perform different enterprise operations. For example, an ERP application supporting a human resources management may store employee records at the DBMS. The ERP application supporting human resources management may perform various tasks related to, for example, using data managed by the DBMS to generate and manage payroll, benefits, and the like. An ERP application supporting accounting may use records managed by the DBMS to perform various accounting-related tasks such as generating and recording invoices, purchase orders, and the like. Other ERP applications may perform other business tasks.

Some ERP applications are arranged in an architecture that is implemented around business objects, sometimes also referred to as data objects. In an ERP application, a data object represents real-world documents or objects used in the business of the entity implementing the ERP application. Example data objects include sales orders, purchase orders, products, raw materials and/or the like.

The ERP application may be arranged to include program components associated with a number of data objects. Each data object program component may incorporate services manipulating instances of the corresponding data objects that are stored at the DBMS. Consider the example sales order data object introduced above. The sales order data object may be associated with a create sales order service. The create sales order service may perform activities associated with creating a sales order such as, for example, checking the validity of the sales order, checking whether inventory is sufficient to fill the sales order, initiating a manufacturing task, verifying that the customer of the sales order is in good standing, and/or the like. As can be seen, many of these tasks involve accessing instances of data objects at the DBMS and/or accessing other data at the DBMS as well as other technical data processing functionality.

Although ERP applications with architectures structured around data objects and associated services may provide certain advantages, they also have disadvantages. For example, business logic for the services associated with a data object may be coded along with data processing functionality, such as, for example, functionality for interfacing with the DBMS. This can limit the flexibility of ERP applications. For example, an enterprise that wishes to modify the business logic implemented by the ERP application may need to modify the entire code associated with business object services, including code dealing with data processing functionality. This can require skilled software developers, which can make the process time-consuming and expensive.

Various examples address these and other disadvantages by implementing an ERP application that is arranged to execute using a number of processing pipelines. A processing pipeline itself is a modelled logical arrangement and connection of other nested processing pipelines and discrete processing units. Each processing unit performs a discrete business or other task. For example, some processing units may perform data processing functionalities, such as, for example, interfacing with the DBMS. Other processing units may perform functionality related to business logic such as validations of user input. In some examples, both the processing pipelines and their processing units may be selectively enabled or disabled so as to modify the effective business logic being executed. In this way, an enterprise utilizing the ERP application may be able to modify the business logic implemented by the ERP application, sometimes without recoding. In some examples, processing pipelines and processing units may be reused for building up adapted or even completely new processing flows and logic.

Due to their defined input and output blocks this can be achieved by connecting them in a declarative manner.

FIG. 1 is a diagram showing one example of an environment 100 for executing an ERP application 104. The environment 100 comprises a computing system 102 executing the ERP application 104 in conjunction with a DBMS 112. In some examples, the ERP application 104 and DBMS 112 may be provided as a common product such as, for example, the S/4 HANA product available from SAP SE of Walldorf, Germany.

The computing system 102 may be implemented in an on-premise environment and/or in a cloud environment. In an on-premise environment, an enterprise utilizing the ERP application 104 and DBMS 112 may maintain the computing system 102 as an on-premise computing system. The ERP application 104 and DBMS 112 may be executed at the on-premise computing system.

In a cloud environment, the computing system 102 is implemented by one or more servers or other computing devices maintained by a cloud provider and accessible remotely. In a private cloud environment, the enterprise using the computing system 102 may provide applications, implement storage, and/or the like to implement the ERP application 104 and DBMS 112. In a public cloud environment, a cloud provider may maintain the computing system 102 and provide a number of tenancies. The cloud provider may provide and maintain executables to implement the ERP application 104 and DBMS 112. An enterprise may purchase a tenancy to permit users associated with that enterprise to access the computing system 102 to use the ERP application 104 and DBMS 112.

Users 162, 164, 166 may access the computing system 102 to interact with the ERP application 104 and DBMS 112. In some examples, users 162, 164, 166 may utilize user computing devices 170, 172, 174 to communicate with the computing system 102. User computing devices 170, 172, 174 may be or include various different types of computing devices such as, for example, desktop computers, laptop computers, tablet computers, mobile computing devices, and/or the like.

The DBMS 112 may store instances of data objects 132, 134, 136. Data objects 132, 134, 136 may be stored at the DBMS 112. In some examples, data objects 132, 134, 136 may include business documents such as, for example, sales orders, purchase orders, manufacturing orders, and/or the like. Instances of data objects 132, 134, 136 may also include records describing physical things, such as products, batches of products, and/or the like.

Each data object 132, 134, 136 may be described by a data model. Instances of a data object 132, 134, 136 may conform to the data model for that data object. The data model for a data object 132, 134, 136 may describe the fields included in instances of the data object 132, 134, 136. For example, the data model may describe fields included in a data object 132, 134, 136, names included in the fields, data types and lengths, a key associated with a data object 132, 134, 136 or instances thereof, and/or the like.

The ERP application 104 may be programmed to perform various transactions on instances of data objects 132, 134, 136. Transactions may include, for example, creating instances of data objects 132, 134, 136, performing various business logic operations on instances of data objects 132, 134, 136, modifying instances of data objects 132, 134, 136, and/or the like.

In the example of FIG. 1, the ERP application 104 is arranged to execute transactions utilizing processing pipelines 106, 108, 110. Processing pipelines 106, 108, 110 comprise one or more processing units 138, 140, 142, 144, 146, 148, 150, 152, 154. Each processing unit 138, 140, 142, 144, 146, 148, 150, 152, 154 comprises executable code that, when executed at the computing system 102, causes the computing system 102 to perform one or more operations. Some processing units 138, 140, 142, 144, 146, 148, 150, 152, 154 are configured to perform technical data processing tasks, such as, for example, interfacing with the DBMS 112. Other processing units 138, 140, 142, 144, 146, 148, 150, 152, 154 can be configured to perform operations that implement business logic. For example, a processing unit may be configured to perform integrity checks on an instance of a data object 132, 134, 136, arrange for the creation of a data object 132, 134, 136, implement a modification to an instance of a data object 132, 134, 136, and/or the like.

The various processing units 138, 140, 142, 144, 146, 148, 150, 152, 154 within a common processing pipeline 106, 108, 110 may communicate via a data collector buffer 120, 122, 124. In some examples, the data collector buffer 120, 122, 124 may be maintained at a persistence associated with a processing pipeline runtime of the respective processing pipeline 106, 108, 110.

The various processing pipelines 106, 108, 110 making up a transaction may be managed by a transaction manager 158. Transaction manager 158 may be or comprise executable code that, when executed at the computing system 102, cause the computing system 102 to manage one or more processing pipelines 106, 108, 110 making up a transaction. For example, the transaction manager 158 may initialize or otherwise cause the execution of the one or more processing pipelines 106, 108, 110 making up the transaction. The transaction manager 158 may also manage a transaction stream buffer 156. The transaction stream buffer 156, for example, may be stored at a persistence assigned to or otherwise associated with the transaction manager 158.

In the example of FIG. 1, the ERP application 104 also comprises entity data controllers 126, 128, 130. Entity data controllers 126, 128, 130 may be configured to interface with the DBMS 112 to access instances of a particular data object 132, 134, 136. For example, the entity data controller 126 may be configured to access instances of the data object 132. The entity data controller 128 may be configured to access instances of the data object 134. The entity data controller 130 may be configured to access instances of the data object 136, and so on.

The example architecture illustrated by FIG. 1 may allow users 162, 164, 166 to modify business logic implemented by the ERP application 104, in some examples, without the need to modify technical data processing portions of the ERP application 104. For example, processing pipelines 106, 108, 110 implemented for a particular transaction may be modified by users 162, 164, 166.

Also, in some examples, a user 162, 164, 166 may be able to modify the specific processing units 138, 140, 142, 144, 146, 148, 150, 152, 154 that are used within a given processing pipeline 106, 108, 110. For example, various processing units 138, 140, 142, 144, 146, 148, 150, 152, 154 may comprise switching functionality permitting a user 162, 164, 166 to enable or disable processing unit 138, 140, 142, 144, 146, 148, 150, 152, 154.

Also, in some examples, processing units 138, 140, 142, 144, 146, 148, 150, 152, 154 may be arranged to execute in the alternative. For example, some processing units 138, 140, 142, 144, 146, 148, 150, 152, 154 may be switch processing units configured to implement switch functionality. For example, a switch processing unit may execute logic to determine a next processing unit (or other operation) to be performed during the execution of a processing pipeline 106, 108, 110.

Figure 2:
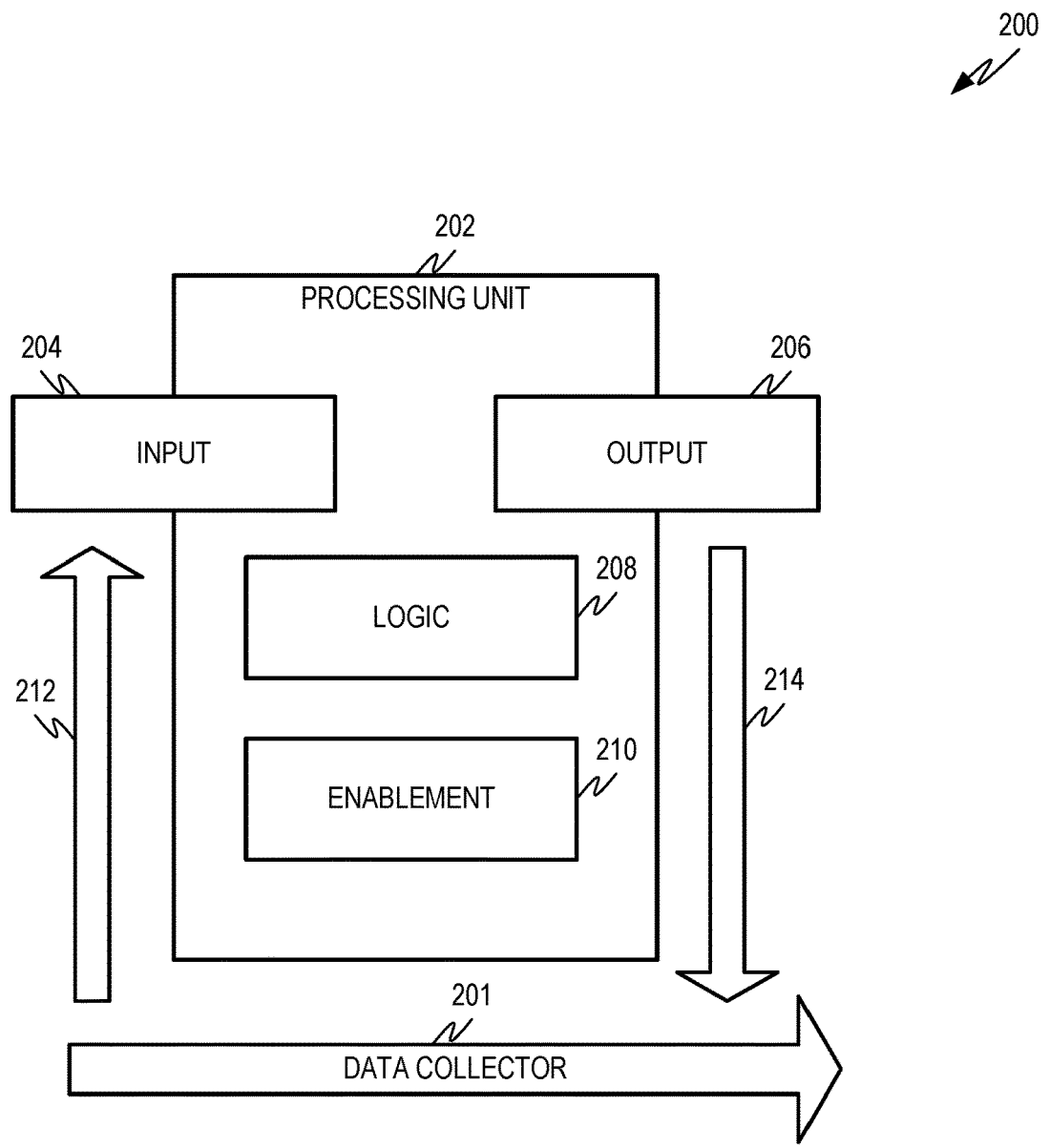
FIG. 2 is a diagram showing one example arrangement of a processing unit.

FIG. 2 is a diagram 200 showing one example arrangement of a processing unit 202. The processing unit 202 may be arranged in a manner similar to some or all of the processing units 138, 140, 142, 144, 146, 148, 150, 152, 154 of FIG. 1.

The processing unit 202 comprises an input block 204, an output block 206, a logic block 208, and an enablement block 210. The input block 204 may be configured to receive processing unit input data 212 from the data collector buffer 201. The logic block 208 may be configured to perform processing on the processing unit input data 212. In some examples, the logic block 208 may execute processing that implements business logic. In other examples, as described herein, the logic block 208 may execute processing that implements technical data processing, such as, for example interfacing with the DBMS 112 and/or the transaction manager 158. The output block 206 may be configured to provide processing unit output data 214 to the data collector buffer 201, for example, where it may be accessed by other processing units 202 of the same processing pipeline as the processing unit 202.

The processing unit 202 also comprises an enablement block 210. The enablement block 210 may be configured, for example, by users 162, 164, 166 to enable or disable execution of the processing unit 202 during execution of a processing pipeline 106, 108, 110. This may provide additional flexibility in the execution of a transaction in the ERP application 104, for example, as described herein.

Figure 3:
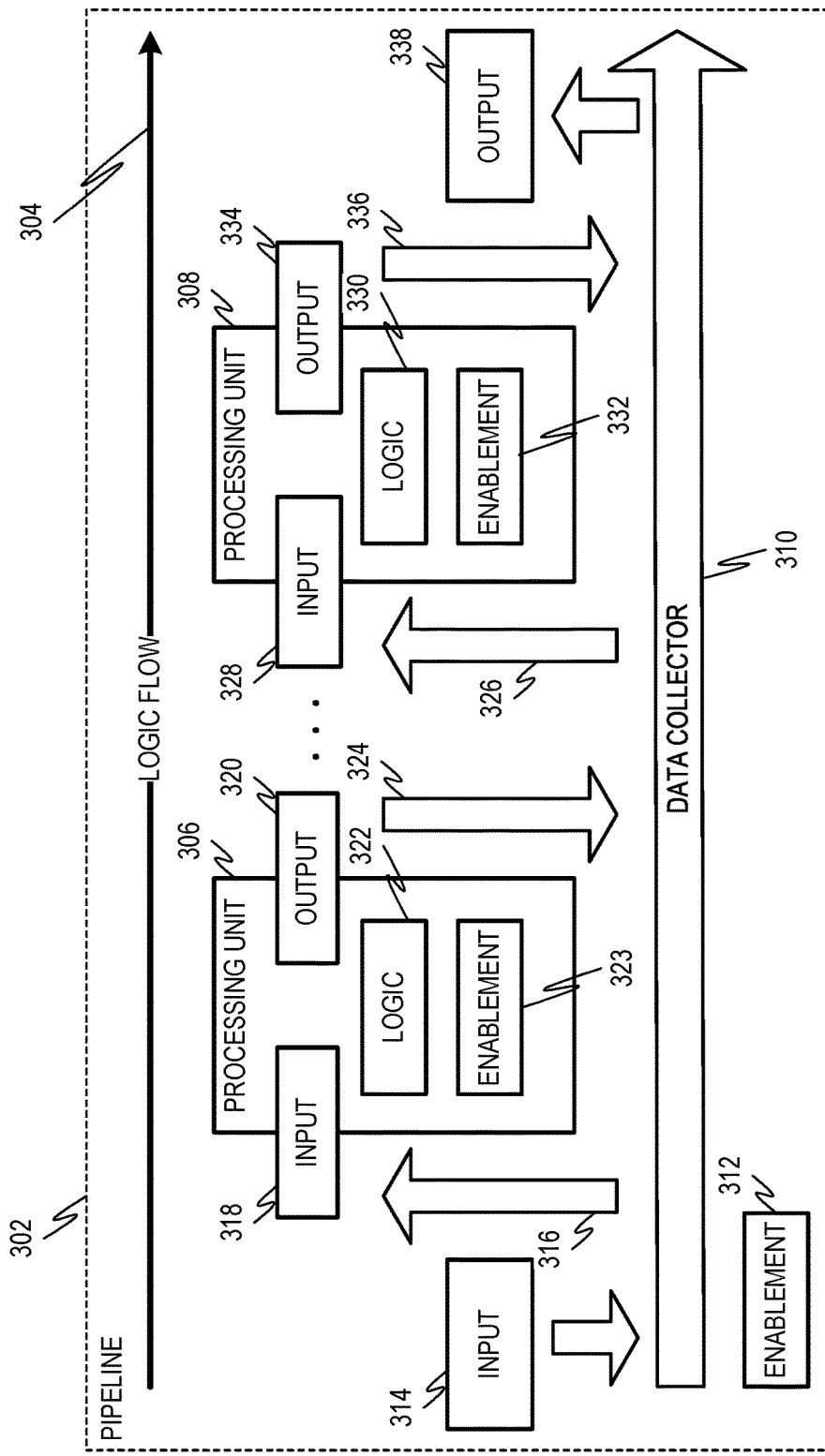
FIG. 3 is a diagram showing one example of a processing pipeline.

FIG. 3 is a diagram showing one example of a processing pipeline 302. The example processing pipeline 302 illustrates one way that the processing pipelines 106, 108, 110 of FIG. 1 may be implemented. In the example of FIG. 3, the processing pipeline 302 is illustrated to proceed in the direction of a logic flow indicated by arrow 304. Processing pipeline 302 may be executed by the ERP application 104. For example, transaction manager 158 may initiate execution of the processing pipeline 302.

Example processing pipeline 302 shown in FIG. 3 comprises two processing units 306, 308. It will be appreciated, however, that various processing pipelines 302 may comprise different numbers of processing units. Also, the logic flow of the processing pipeline 302 (illustrated by logic flow arrow 304) is linear, proceeding from processing unit 306 and ultimately to processing unit 308. It will be appreciated that, in some examples, a processing pipeline 302 may comprise a logic flow that is nonlinear. For example, a processing pipeline 302 may comprise a switch processing unit that may select processing units for execution, for example, according to a logic block of the switch processing unit.

The processing pipeline 302 may receive processing pipeline input data 314, which is provided to the data collector buffer 310. In some examples, the processing pipeline 302 comprises a processing pipeline runtime, which executes to manage the data collector buffer 310 and may call the processing units 306, 308 making up the processing pipeline 302. In some examples, as described herein, a processing pipeline 302 may comprise a receiver processing unit, which may receive the input data 314 from the transaction stream buffer and write it to the data collector buffer 310.

The processing unit 306 may receive processing unit input data 316 via the input block 318. The processing unit 306 may execute logic block 322 to generate processing unit output data 324. The processing unit output data 324 is provided to the data collector buffer 310 via the output block 320. Similarly, the processing unit 308 may receive processing unit input data 326 via input block 328. In some examples, the processing unit input data 326 is equivalent to the processing unit output data 324 generated by the processing unit 306. Also, as shown, in some examples there may be intermediate processing units (not shown) that further operate on processing unit output data 324 to generate processing unit input data 326. The processing unit 308 may execute logic block 330 to generate processing unit output data 336 that is provided to the data collector buffer 310 via output block 334. The output data 338 of the processing pipeline 302 may be on the data collector buffer 310 at the conclusion of the execution of the various processing units 306, 308. In some examples, the processing pipeline 302 may comprise a create, read, update, delete (CRUD) processing unit that is configured to write output data 338 to the transaction stream buffer associated with the transaction.

In the example of FIG. 3, the processing units 306, 308 and the processing pipeline 302 comprise enablement blocks 312, 323, 332. For example, a user 162, 164, 166 may selectively enable or disable individual processing units 306, 308 and/or the processing pipeline 302 as a whole. This may provide the users 162, 164, 166 with a way to modify the logic implemented by the ERP application 104 without recoding the ERP application 104.

FIGS. 4-8 show examples of processing units configured to perform particular tasks. In various examples, the ERP application 104, and/or the transaction manager 158 for a particular transaction, is configured to initiate processing units similar to those shown at FIG. 2 and at FIGS. 4-8 in various different combinations and in various different orders to implement a transaction, for example, as described herein.

Figure 4:
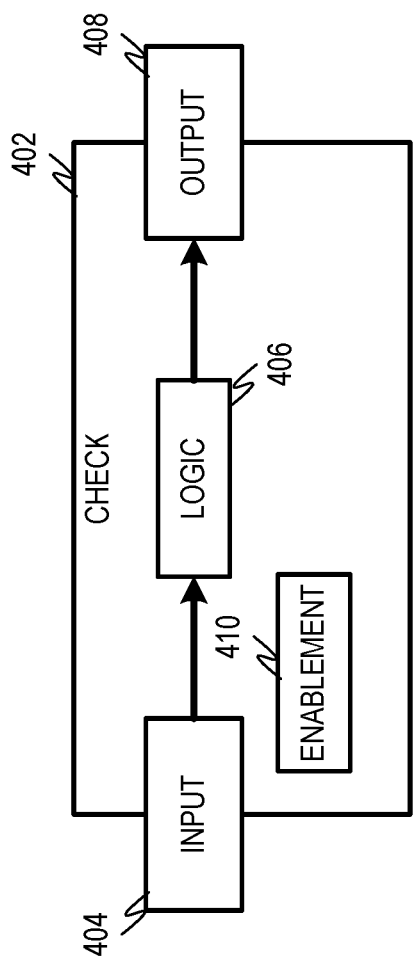
FIG. 4 is a diagram showing one example of a check processing unit.

FIG. 4 is a diagram showing one example of a check processing unit 402. The check processing unit 402 may comprise an input block 404, an output block 408, and a logic block 406. The check processing unit 402 may be configured to perform one or more check routines on its input data. The input data may include, for example, contextual information about a logged-on user 162, 164, 166; transiently calculated values (e.g., calculated by another processing unit); data making up all or part of an instance of a data object 132, 134, 136; and/or the like.

Input data for the check processing unit 402 (e.g., received by the input block 404) may include the data that is to be checked. The logic block 406 may be programmed to implement a specific check to the input data. For example, logic block 406 may be configured to apply one or more verification rules to the input data. The one or more verification rules may include, for example, rules to verify that the input data is of the proper format, is valid, and/or the like. Output data generated by the check processing unit 402 may include, for example, one or more messages indicating whether the input data has passed the check and/or verification rules implemented by the logic block 406. As described herein, the input data for the check processing unit 402 may be received from a data collector buffer implemented by the processing pipeline including the check processing unit 402. The output data may be likewise written to the data collector buffer. The check processing unit 402 may comprise an enablement block 410 that may be utilized by one or more of the users 162, 164, 166 to selectively enable or disable the check processing unit 402.

Figure 5:
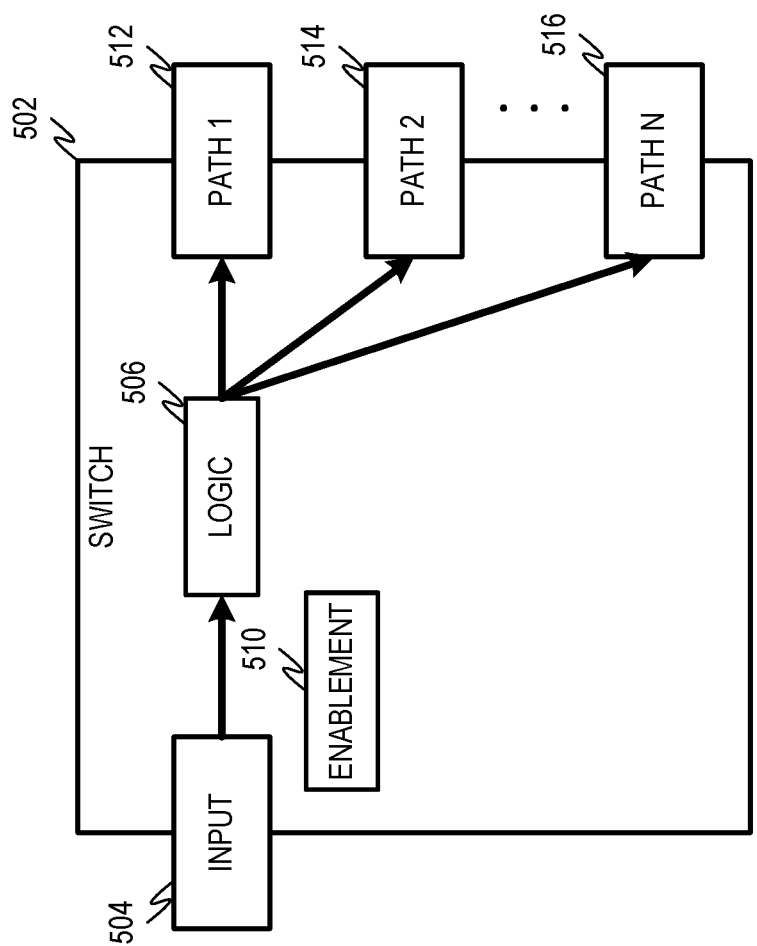
FIG. 5 is a diagram showing one example of a switch processing unit.

FIG. 5 is a diagram showing one example of a switch processing unit 502. The switch processing unit 502 may comprise an input block 504, a logic block 506, an enablement block 510, and various output path blocks 512, 514, 516.

The switch processing unit 502 may receive input data (e.g., from the data collector buffer associated with the corresponding processing pipeline) via the input block 504. The input data may include, for example, data generated by other processing units of the corresponding processing pipeline. The logic block 506 may be configured to select a single or multiple output path blocks 512, 514, 516 based on the input data.

Each output path block 512, 514, 516 may initiate a next action in the transaction. In some examples, an output path block 512, 514, 516 may initiate a different processing unit, causing the different processing unit to execute. In some examples, one or more of the output path blocks 512, 514, 516 may prompt the transaction manager 158 to conclude the transaction, for example, by executing a save. In some examples, the logic block 506 of the switch processing unit 502 may be programmed to, for some values of the input data, select more than one of the output path blocks 512, 514, 516. If multiple paths are selected, the corresponding paths may be processed in parallel. The switch processing unit 502 may comprise an enablement block 510 that may be utilized by one or more of the users 162, 164, 166 to selectively enable or disable the switch processing unit 502, which disables all paths and their processing logic.

Figure 6:
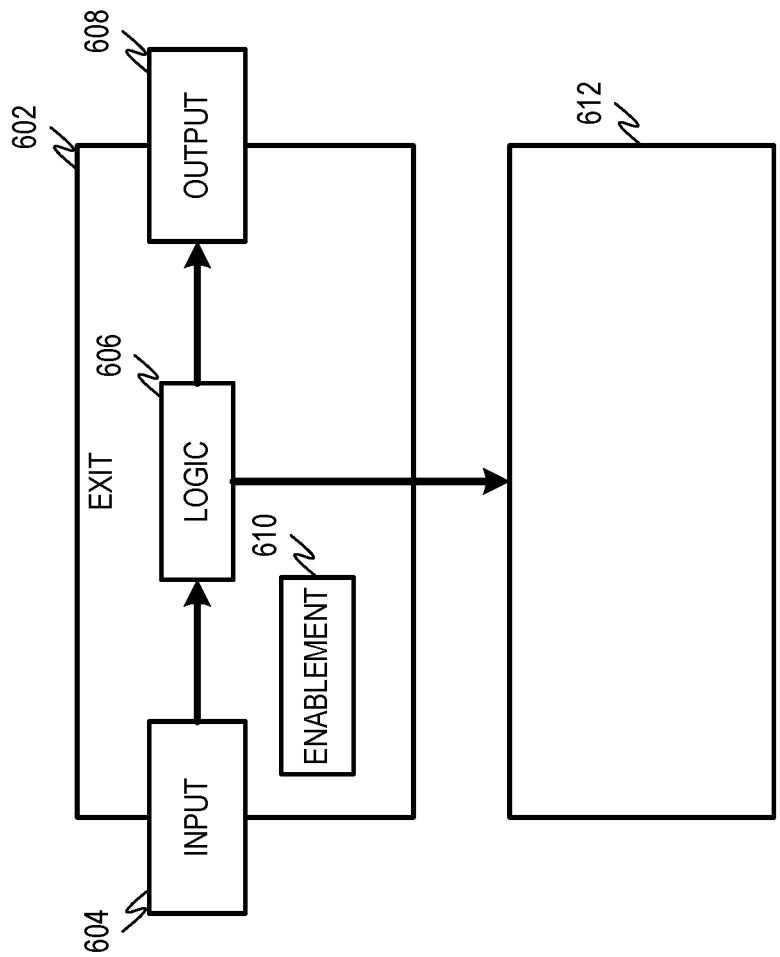
FIG. 6 is a diagram showing one example of an exit processing unit.

FIG. 6 is a diagram showing one example of an exit processing unit 602. The exit processing unit 602 may be used, for example, to call a function or process outside of the current transaction. The exit processing unit 602 may comprise an input block 604, a logic block 606, an output block 608, and an enablement block 610. The exit processing unit 602 may receive input data from the data collector buffer associated with its processing pipeline via input block 604. The logic block 606 may also call an outside function 612. The outside function 612 may be a function outside of the current transaction. For example, the outside function 612 may be a function, process, or service implemented by the ERP application 104. In some examples, the input data indicates information about the outside function 612 including, for example, an identity of the outside function 612, a location of the outside function 612, parameters to be used when calling the outside function 612 and/or the like. Output data generated by the logic block 606 may include data describing the calling of the outside function 612. In some examples, result data generated by the outside function may be written to the data collector buffer for the corresponding processing pipeline by the output block 608. The exit processing unit 602 may comprise an enablement block 610 that may be utilized by one or more of the users 162, 164, 166 to selectively enable or disable the exit processing unit 602.

Figure 7:
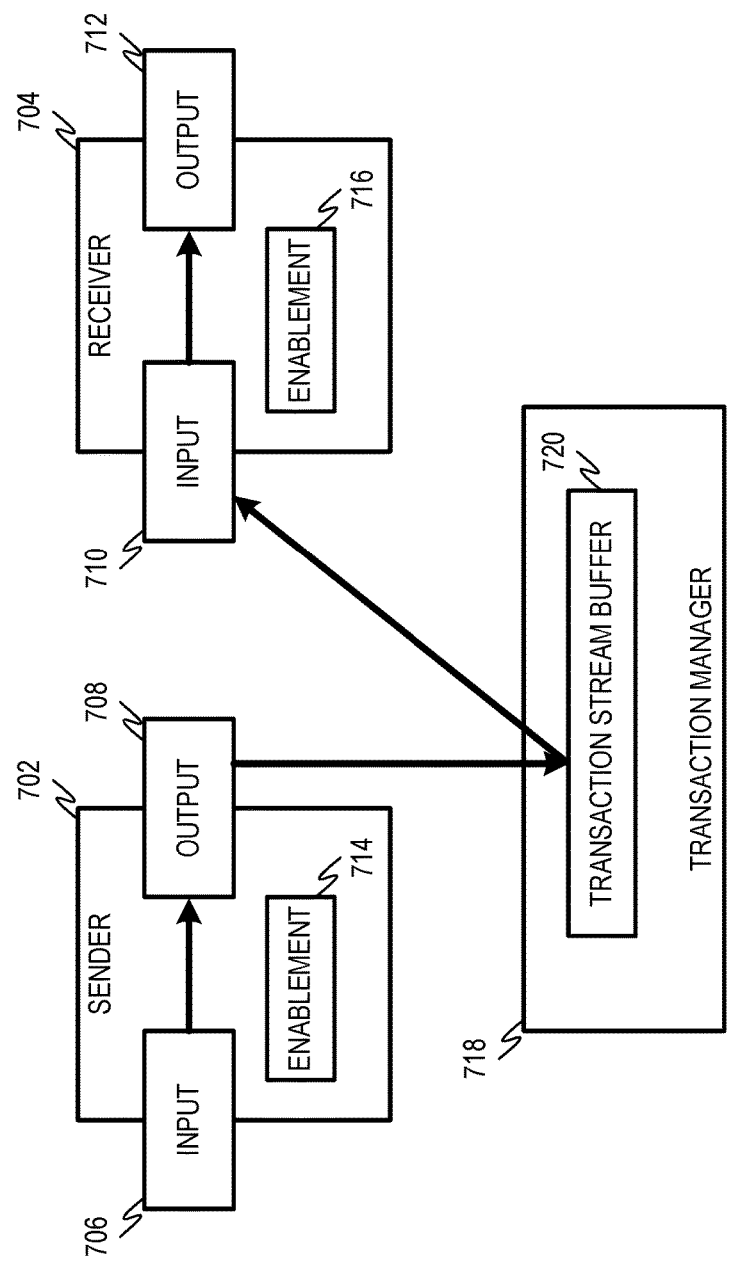
FIG. 7 is a diagram showing an example sender processing unit and an example receiver processing unit.

FIG. 7 is a diagram 700 showing an example sender processing unit 702 and an example receiver processing unit 704. In some examples, sender processing unit 702 and receiver processing unit 704 may be used by processing pipelines to provide data to and receive data from the transaction stream buffer for a given transaction.

The sender processing unit 702 comprises an input block 706, an output block 708, and an enablement block 714. The input block 706 may receive processing unit input data from the data collector buffer associated with the corresponding processing pipeline. In some examples, the processing unit input data comprises all or part of data that the sender processing unit 702 is to receive from the transaction stream buffer 720. The input block 706 and/or the output block 708 may perform data selection, data formatting, and/or other processing to prepare input data to be provided to the transaction stream buffer 720. The output block 708 may provide a notification to the transaction stream buffer 720, managed by the transaction manager 718. The notification may comprise data to be written to the transaction stream buffer 720. The data may be and/or be derived from the processing unit input data. In some examples, the notification may indicate one or more receiver processing units that are to receive the notification, such as the receiver processing unit 704. Receiver processing units that are to receive the notification may be part of the same processing pipeline as the sender processing unit 702 or may be part of different processing pipelines.

In some examples, the transaction manager 718, upon receipt of a notification, is configured to provide some or all of the data from the notification to an indicated receiver processing unit. In some examples (e.g., when the receiver processing unit 704 is part of a different processing pipeline), the transaction manager 718 may initiate the processing pipeline comprising receiver processing unit 704 upon receipt of the notification. Based on the configuration, the invocation of the receiver processing unit 704 may be immediately executed or be deferred to a predefined point in time such as, for example, deferred to the start of the pre-save phase.

The receiver processing unit 704 may receive some or all of the data from a notification at its input block 710. The receiver processing unit 704 may utilize its output block 712 to write all or part of the received data to the data collector buffer of its corresponding processing pipeline.

Sender processing unit 702 and receiver processing unit 704 may comprise respective enablement blocks 714, 716. The enablement blocks 714, 716 may be utilized by one or more of the users 162, 164, 166 to selectively enable or disable the sender processing unit 702 and/or the receiver processing unit 704.

Figure 8:
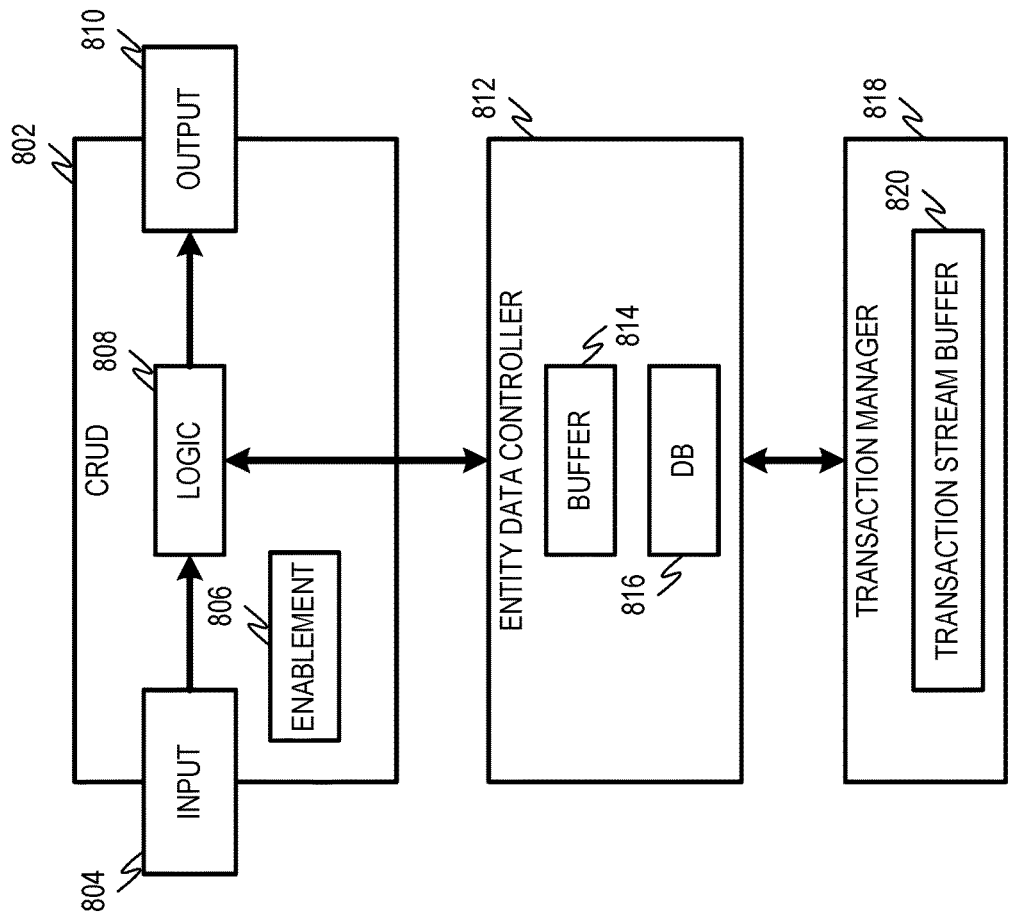
FIG. 8 is a diagram showing one example of a create, read, update, delete (CRUD) processing unit.

FIG. 8 is a diagram showing one example of a create, read, update, delete (CRUD) processing unit 802. A CRUD processing unit 802 may be configured to perform various data processing tasks including, for example, interfacing with the DBMS 112. CRUD processing unit 802 may receive processing unit input data via its input block 804. The processing unit input data may include, for example, dated to be written to one or more instances of a data object 132, 134, 136 at the DBMS 112. In some examples, the processing unit input data may include an instruction to read some or all of an instance (or instances) of a data object 132, 134, 136 at the DBMS 112.

The logic block 808 of the CRUD processing unit 802 may be in communication with one or more entity data controllers, such as the entity data controller 812. The entity data controller 812 may be configured to interface with the DBMS 112 to create, read, update, or delete instances of data objects of a type corresponding to the entity data controller 812. In some examples, the CRUD processing unit 802 is configured to perform one or more CRUD operations with respect to instances of more one data object 132, 134, 136. In these examples, the CRUD processing unit 802 may be in communication with multiple entity data controllers 812.

The logic block 808 of the CRUD processing unit 802 may provide the entity data controller 812 with instructions and data for performing a suitable CRUD operation at the DBMS 112. The entity data controller 812 may comprise a buffer 814 that may be used to store data received from the logic block 808 for writing to the DBMS 112 and/or to store data received from the DBMS 112 to be provided to the CRUD processing unit 802. The entity data controller 812 may also comprise a database interface block 816 that is configured to communicate with the DBMS 112. The CRUD processing unit 802 may comprise an output block 810 that may be used to write processing unit output data to the data collector buffer associated with the processing pipeline including the CRUD processing unit 802. Output data generated by the CRUD processing unit 802 may include, for example, data read from the buffer 814, data read from the database interface block 816, and/or data indicating the success or failure of the write to the database interface block 816.

The CRUD processing unit 802 may comprise an enablement block 806 that may be utilized by one or more of the users 162, 164, 166 to selectively enable or disable the CRUD processing unit 802.

FIG. 8 also shows an example transaction manager 818 for the transaction including the CRUD processing unit 802. The transaction manager 818 manages a transaction stream buffer 820, for example, as described herein. The entity data controller 812 may be in communication with the transaction manager 818, for example, to report the status of operations between the entity data controller 812 and the DBMS 112.

Figure 9:
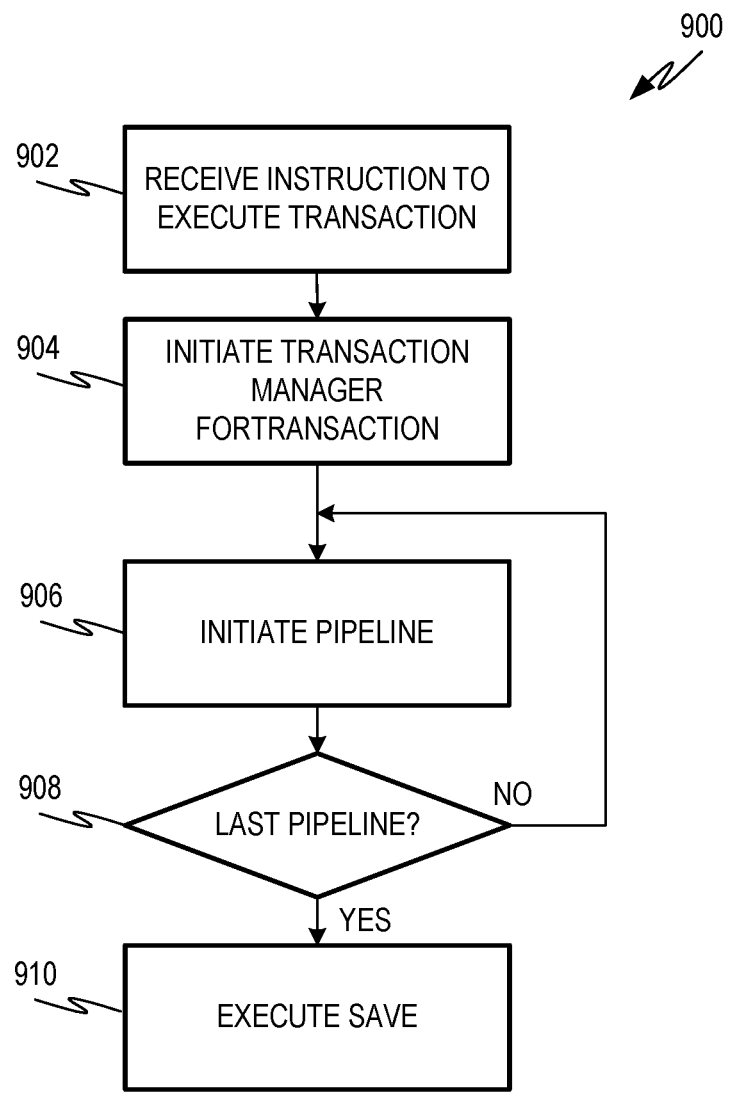
FIG. 9 is a flowchart showing one example of a process flow that may be executed, for example in the environment of FIG. 1, to implement a transaction in an enterprise resource application.

FIG. 9 is a flowchart showing one example of a process flow 900 that may be executed, for example in the environment 100 of FIG. 1 to implement a transaction in an enterprise resource application 104. At operation 902, the ERP application 104 may receive an instruction to execute a transaction. The transaction may involve an instance of a data object 132, 134, 136 stored at the DBMS 112. For example, the transaction may include generating an instance of a data object 132, 134, 136. In some examples, the generating of an instance of a data object 132, 134, 136 may be based on other data object instances at the DBMS 112. Consider an example transaction for generating an instance of a sales order data object. Such a transaction may refer to an instance of a product data object describing a product that is a subject of the sales order. In another example in which a sales order is for the sale of a service, a transaction to generate the sales order may refer to an instance of a service data object describing a service to be provided.

At operation 904, the ERP application 104 may initiate a transaction manager 158 for the transaction. The transaction manager 158 may implement a transaction stream buffer 156. Transaction stream buffer 156, as described herein, may comprise locations for storing data that is buffered by the various processing pipelines 106, 108, 110 of the transaction. For example, a processing pipeline may comprise a sender processing unit that sends a notification to the transaction stream buffer 156 including data. The data included in the notification may be accessible by one or more receiver processing units in other processing pipelines of the transaction.

At operation 906, a first processing pipeline of the transaction may be initiated. In some examples, processing pipelines may be initiated by the ERP application 104, by the transaction manager 158, and/or by other processing pipelines 106, 108, 110. An initiated processing pipeline may execute and perform its programmed task. At operation 908, it may be determined whether the processing pipeline is the last processing pipeline included in the transaction. If the current processing pipeline is not the last processing pipeline included in the transaction (e.g., if there are additional processing pipelines to be executed), a next processing pipeline may be initiated at operation 906.

When all processing pipelines 106, 108, 110 of the transaction have been executed (or skipped, for example, if a processing pipeline is disabled), then the transaction manager 158 may execute a transaction save at operation 910. A transaction save may include providing output data from the various processing pipelines 106, 108, 110 to the DBMS 112 in relation to one or more instances of data objects 132, 134, 136. For example, the output data of the various processing pipelines may indicate a modification to an existing instance of a data object 132, 134, 136 at the DBMS 112. In this case, executing the transaction save may include taking some or all of the output data and using it to modify the existing instance or instances of a data object 132, 134, 136. Also, in some examples, the output data of the various processing pipelines may indicate a new instance of a data object 132, 134, 136 to be generated. In this example, executing the transaction save may include creating one or more new data object instances.

Figure 10:
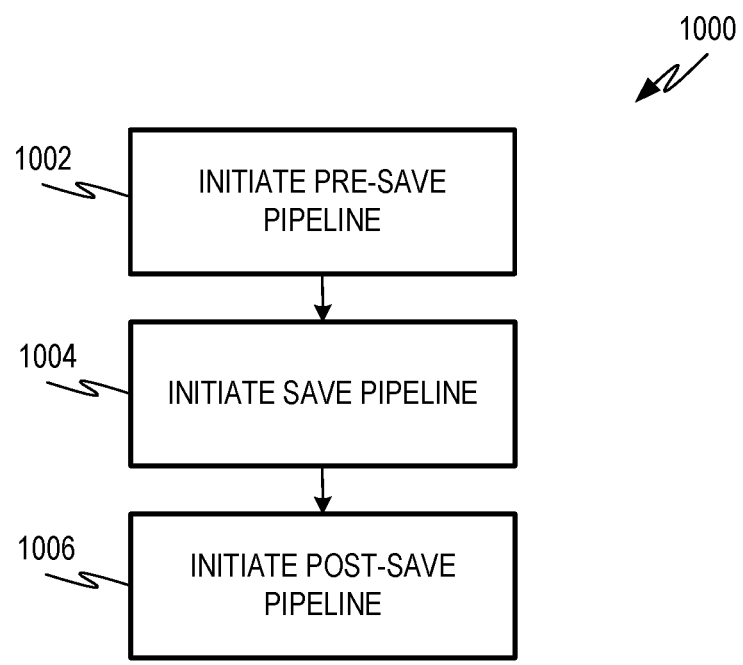
FIG. 10 is a flowchart showing one example of a process flow that may be executed, for example, by the transaction manager to execute a transaction save.

FIG. 10 is a flowchart showing one example of a process flow 1000 that may be executed, for example, by the transaction manager 158 to execute a transaction save. For example, the process flow 1000 shows one example way of executing operation 910 of the process flow 900. In the example of FIG. 10, the transaction manager 158 utilizes one or more processing pipelines to execute all or part of the transaction save. For example, at operation 1002, the transaction manager 158 may initiate a pre-save processing pipeline. The pre-save processing pipeline may comprise one or more check processing units that may execute to perform one or more checks of output data generated by the prior processing pipeline or pipelines of the transaction. In some examples, the pre-save processing pipeline may also be utilized for completing data modifications. For example, the pre-save processing pipeline may comprise one or more CRUD processing units, as described herein, for modifying output data from a previous processing unit and/or from a previous processing pipeline.

At operation 1004, the transaction manager 158 may implement a save pipeline. The save pipeline may be configured to modify and/or create one or more instances of a data object 132, 134, 136 at the DBMS 112. In some examples, the save pipeline may comprise one or more CRUD processing units, for example, as described herein. At operation 1006, the transaction manager 158 may initiate a post-save processing pipeline. The post-save processing pipeline may perform various post-save processes such as, for example, clearing various buffers.

Figure 11:
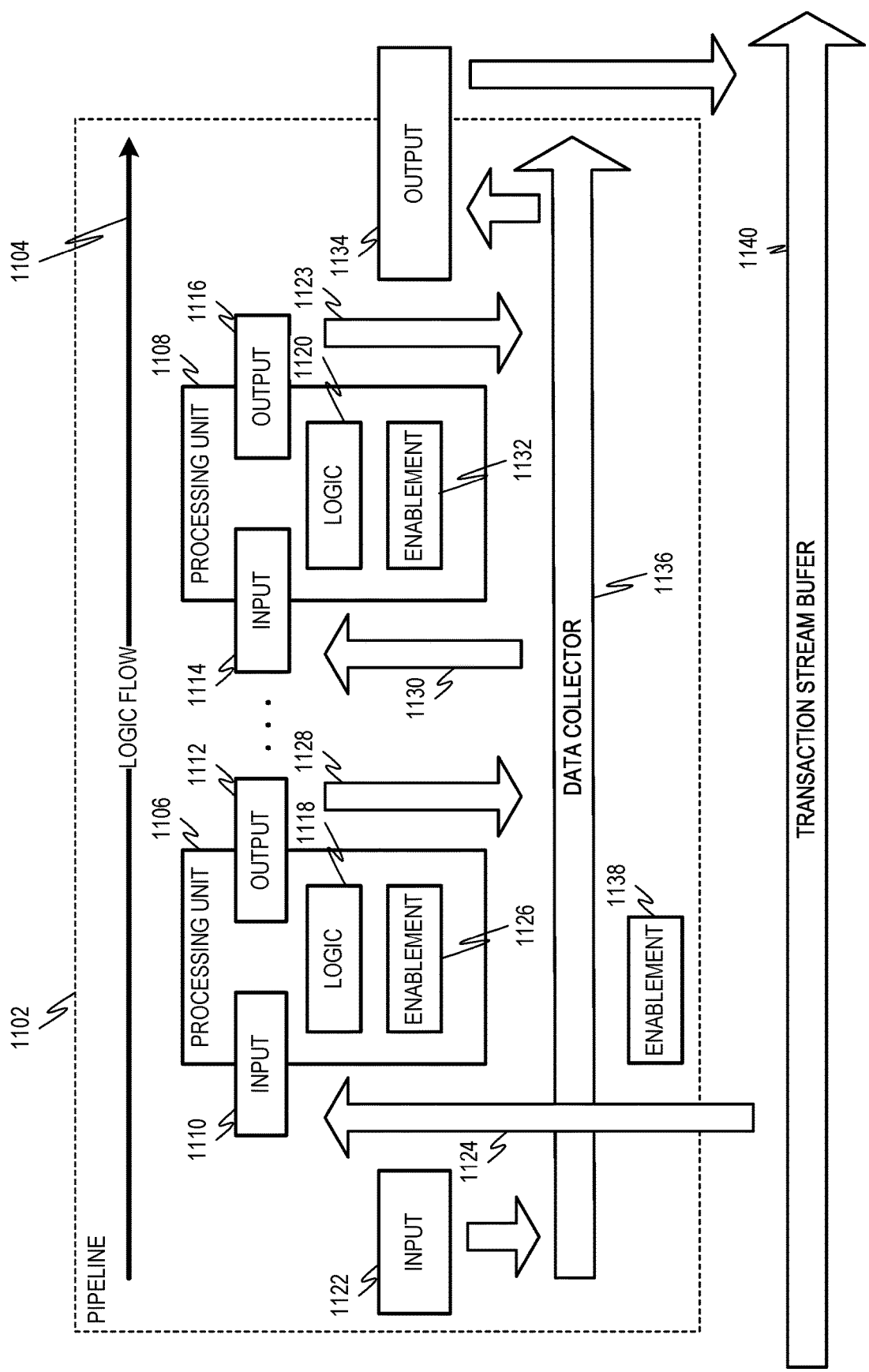
FIG. 11 is a diagram showing one example of a pre-save processing pipeline.

FIG. 11 is a diagram showing one example of a pre-save processing pipeline 1102. For example, transaction manager 158 may call the pre-save processing pipeline 1102 to implement the operation 1002 of the process flow 1000. The pre-save processing pipeline 1102 comprises logic proceeding in the direction of the arrow 1104 shown in FIG. 11.

The example pre-save processing pipeline 1102 shown in a FIG. 11 comprises processing units 1106 and 1108. Processing unit 1106 comprises an input block 1110, an output block 1112, a logic block 1118, and an enablement block 1126. Processing unit 1108 may similarly comprise an input block 1114, and output block 1116, a logic block 1120, and an enablement block 1132. FIG. 11 also depicts a transaction stream buffer 1140, which may be implemented by a transaction manager, such as the transaction manager 158.

The transaction manager 158 may call the pre-save processing pipeline 1102 and may provide input data 1122. The input data 1122 may be provided to the data collector buffer 1136, for example, by the transaction manager 158, when the pre-save processing pipeline 1102 is called. The input data 1122 may, in some examples, comprise an indication of the data that is subject to pre-save and an indication of one or more checks to be performed on the data.

The processing unit 1106 may, via its input block 1110, receive pre-save data 1124 from the transaction stream buffer 1140. The pre-save data 1124 may be data generated by one or more other processing pipelines of the transaction. In some examples, the processing unit 1106 may apply its logic block 1118 to perform one or more checks on the received pre-save data 1124. The processing unit 1106 may generate processing unit output data 1128 provided to the data collector buffer 1136 via the output block 1112. Processing unit output data 1128 may include, for example, a version of the pre-save data 1124 and/or data indicating the result of one or more checks performed on the pre-save data 1124 by the processing unit 1106.

The processing unit 1108 may receive processing unit input data 1130 via its input block 1114. The processing unit input data 1130 may comprise, for example, all or part of the pre-save data 1124 and/or the results of the one or more checks performed by the processing unit 1106. The processing unit 1108 may utilize its logic block 1120 to perform one or more additional checks on the pre-save data 1124. Processing unit output data 1123 may comprise results of the checks performed by the processing unit 1108. The processing unit output data 1123 may be written to the data collector buffer 1136 via the output block 1116. At the conclusion of the execution of the processing units 1106, 1108, pre-save processing pipeline output data 1134 may be copied from the data collector buffer 1136 to the transaction stream buffer 1140. The pre-save processing pipeline output data 1134 may indicate results of checks performed on the pre-save data 1124 by the various processing units 1106, 1108 of the pre-save processing pipeline 1102. In some examples, the pre-save processing pipeline output data 1134 may also apprise an indication for the transaction manager to exit and or cancel further save processing.

As described herein, various components of the pre-save processing pipeline 1102 may be selectively enabled or disabled by one or more users 162, 164, 166. This is represented by enablement blocks 1126 and 1132 of the respective processing units 1106, 1108. Also, the pre-save processing pipeline 1102 may comprise an enablement block 1138 that may enable or disable the pre-save processing pipeline 1102.

Figure 12:
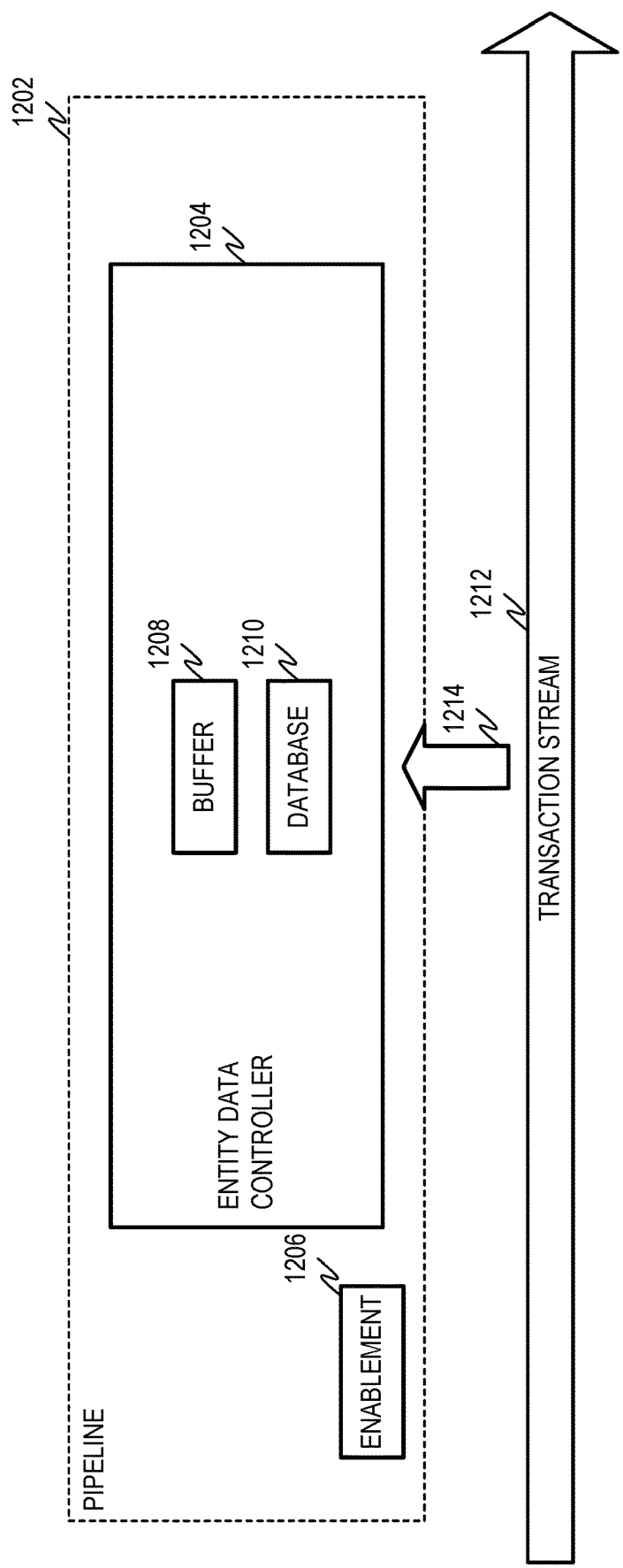
FIG. 12 is a diagram showing one example of a save processing pipeline.

FIG. 12 is a diagram showing one example of a save processing pipeline 1202. For example, the transaction manager 158 may call the save processing pipeline 1202 as all or part of executing the operation 1004 of the process flow 1000. Save processing pipeline 1202 comprises an entity data controller 1204 and may be in communication with a DBMS buffer 1208. A transaction stream buffer 1212 may be managed by the transaction manager 158, as described herein. An enablement block 1206 of the save processing pipeline may be utilized by one or more users 162, 164, 166 to enable or disable the save processing pipeline 1202.

The entity data controller 1204 may receive save data 1214 from the transaction stream buffer 1212. The save data 1214 may comprise data that is to be written to a database interface block 1210, for example, to create or modify an instance of a data object 132, 134, 136. The entity data controller 1204 may write the save data 1214 to the database buffer 1208 and ultimately to the DBMS via the database interface block 1210.

EXAMPLES

Example 1 is a computing system for performing data object operations, the computing system comprising: at least one processor programmed to perform operations comprising: executing an application; receiving, by the application, an instruction to perform a transaction associated with a data object stored at a database management system: initiating, by the application, execution of a transaction manager, the transaction manager to manage a transaction stream buffer: executing a first processing pipeline for the transaction, the executing of the first processing pipeline comprising: executing a first processing unit of the first processing pipeline, the executing of the first processing unit comprising accessing first processing unit input data from a transaction stream buffer associated with the first processing pipeline, and writing first processing unit output data to the transaction stream buffer: and initiating, by the transaction manager, a save process to write the first processing unit output data to the data object stored at the database management system.

In Example 2, the subject matter of Example 1 optionally includes the initiating of the save process comprising executing, by the application, a save processing pipeline, the executing of the save processing pipeline comprising: executing a save processing unit of the save processing pipeline, the save processing unit being to access the first processing unit output data from the transaction stream buffer and provide the first processing unit output data to an entity data controller associated with the data object.

In Example 3, the subject matter of Example 2 optionally includes the operations further comprising writing, by the entity data controller, the first processing unit output data to the data object stored at the database management system.

In Example 4, the subject matter of any one or more of Examples 2-3 optionally include the executing of the save processing pipeline further comprising executing a check processing unit, the check processing unit to apply at least one verification rule to the first processing unit output data.

In Example 5, the subject matter of any one or more of Examples 1-4 optionally include the operations further comprising executing, by the application, the save process, the executing of the save process comprising: executing a pre-save operation to perform at least one check of the first processing unit output data: executing a save operation to save the first processing unit output data to the data object: and executing a post-save operation to clear a memory location associated with the transaction stream buffer.

In Example 6, the subject matter of Example 5 optionally includes the executing of the save process further comprising executing a CRUD processing unit, the CRUD processing unit being to apply at least one modification to the first processing unit output data prior to executing the save operation.

In Example 7, the subject matter of any one or more of Examples 1-6 optionally include the executing of the first processing pipeline further comprising, before executing the first processing unit, executing a switch processing unit, the executing of the switch processing unit comprising: reading switch processing unit input data from the transaction stream buffer associated with the first processing pipeline: selecting the first processing unit from a plurality of processing units associated with the first processing pipeline: and initiating the executing of the first processing unit.

In Example 8, the subject matter of any one or more of Examples 1-7 optionally include the operations further comprising: executing a receiver processing unit of the first processing pipeline: receiving, by the receiver processing unit, notification data from the transaction stream buffer: and writing, by the receiver processing unit, the first processing unit input data to the transaction stream buffer associated with the first processing pipeline, the first processing unit input data being based at least in part on the notification data.

In Example 9, the subject matter of any one or more of Examples 1-8 optionally include the executing of the first processing pipeline further comprising executing an exit processing unit, the exit processing unit to call an outside function outside of the first processing pipeline.

Example 10 is a method of performing data object operations in a computing system, comprising: receiving, by an application executing at the computing system, an instruction to perform a transaction associated with a data object stored at a database management system: initiating, by the application, execution of a transaction manager, the transaction manager to manage a transaction stream buffer: executing a first processing pipeline for the transaction, the executing of the first processing pipeline comprising: executing a first processing unit of the first processing pipeline, the executing of the first processing unit comprising accessing first processing unit input data from a transaction stream buffer associated with the first processing pipeline, and writing first processing unit output data to the transaction stream buffer: and initiating, by the transaction manager, a save process to write the first processing unit output data to the data object stored at the database management system.

In Example 11, the subject matter of Example 10 optionally includes the initiating of the save process comprising executing, by the application, a save processing pipeline, the executing of the save processing pipeline comprising: executing a save processing unit of the save processing pipeline, the save processing unit being to access the first processing unit output data from the transaction stream buffer and provide the first processing unit output data to an entity data controller associated with the data object.

In Example 12, the subject matter of Example 11 optionally includes writing, by the entity data controller, the first processing unit output data to the data object stored at the database management system.

In Example 13, the subject matter of any one or more of Examples 11-12 optionally include the executing of the save processing pipeline further comprising executing a check processing unit, the check processing unit being to apply at least one verification rule to the first processing unit output data.

In Example 14, the subject matter of any one or more of Examples 10-13 optionally include executing, by the application, the save process, the executing of the save process comprising: executing a pre-save operation to perform at least one check of the first processing unit output data; executing a save operation to save the first processing unit output data to the data object: and executing a post-save operation to clear a memory location associated with the transaction stream buffer.

In Example 15, the subject matter of any one or more of Examples 12-14 optionally include the executing of the save process further comprising executing a CRUD processing unit, the CRUD processing unit being to apply at least one modification to the first processing unit output data prior to executing the save operation.

In Example 16, the subject matter of any one or more of Examples 10-15 optionally include the executing of the first processing pipeline further comprising, before executing the first processing unit, executing a switch processing unit, the executing of the switch processing unit comprising: reading switch processing unit input data from the transaction stream buffer associated with the first processing pipeline: selecting the first processing unit from a plurality of processing units associated with the first processing pipeline: and initiating the executing of the first processing unit.

In Example 17, the subject matter of any one or more of Examples 10-16 optionally include executing a receiver processing unit of the first processing pipeline: receiving, by the receiver processing unit, notification data from the transaction stream buffer: and writing, by the receiver processing unit, the first processing unit input data to the transaction stream buffer associated with the first processing pipeline, the first processing unit input data being based at least in part on the notification data.

In Example 18, the subject matter of any one or more of Examples 10-17 optionally include the executing of the first processing pipeline further comprising executing an exit processing unit, the exit processing unit to call an outside function outside of the first processing pipeline.

Example 19 is a non-transitory machine-readable medium comprising instructions thereon that, when executed by at least one processor, cause the at least one processor to perform operations comprising: executing an application: receiving, by the application, an instruction to perform a transaction associated with a data object stored at a database management system: initiating, by the application, execution of a transaction manager, the transaction manager to manage a transaction stream buffer: executing a first processing pipeline for the transaction, the executing of the first processing pipeline comprising: executing a first processing unit of the first processing pipeline, the executing of the first processing unit comprising accessing first processing unit input data from a transaction stream buffer associated with the first processing pipeline, and writing first processing unit output data to the transaction stream buffer; and initiating, by the transaction manager, a save process to write the first processing unit output data to the data object stored at the database management system.

In Example 20, the subject matter of Example 19 optionally includes the initiating of the save process comprising executing, by the application, a save processing pipeline, the executing of the save processing pipeline comprising: executing a save processing unit of the save processing pipeline, the save processing unit being to access the first processing unit output data from the transaction stream buffer and provide the first processing unit output data to an entity data controller associated with the data object.

Figure 13:
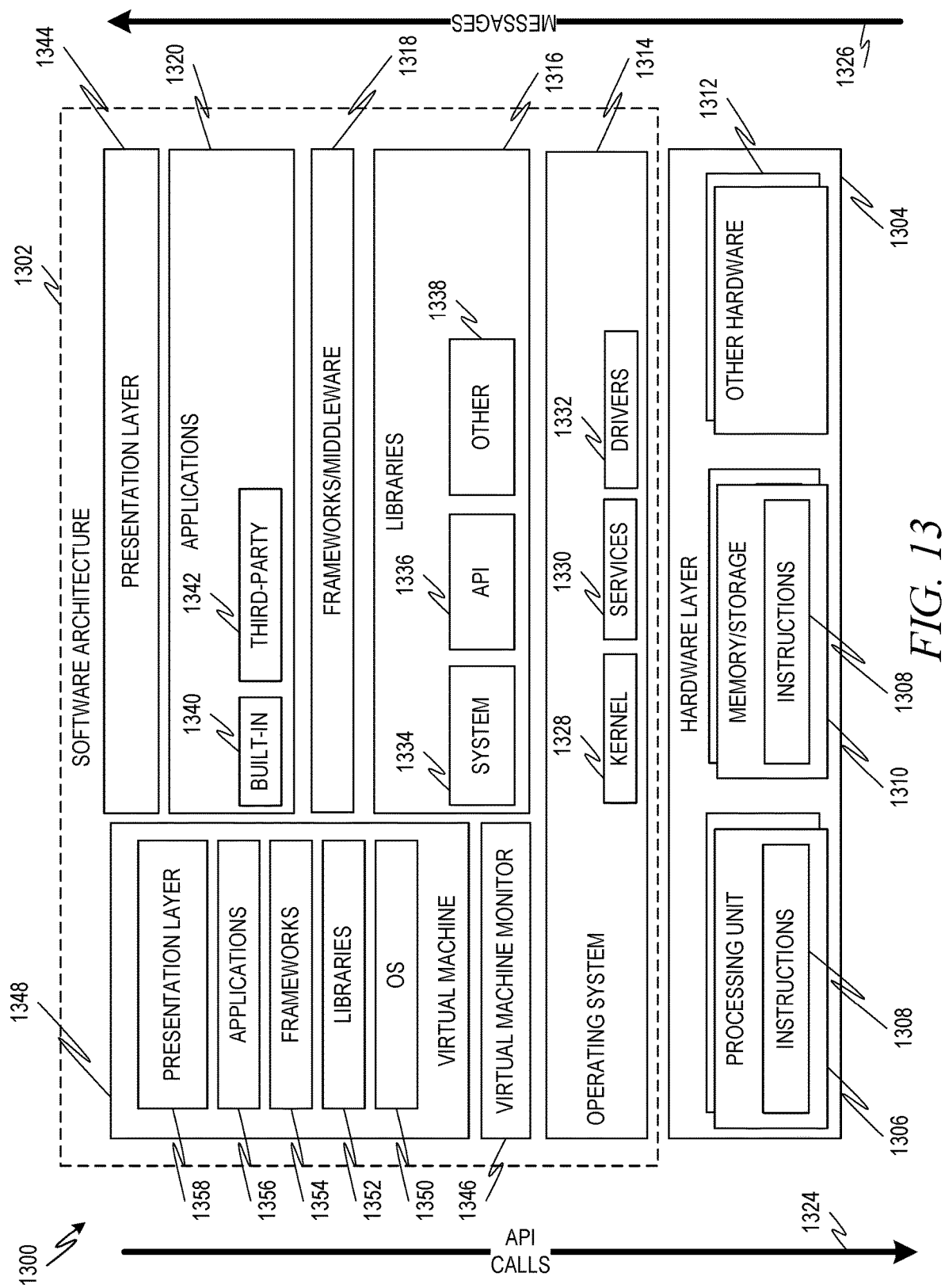
FIG. 13 is a block diagram showing one example of an architecture for a computing device.

FIG. 13 is a block diagram 1300 showing one example of a software architecture 1302 for a computing device. The architecture 1302 may be used in conjunction with various hardware architectures, for example, as described herein. FIG. 13 is merely a non-limiting example of a software architecture and many other architectures may be implemented to facilitate the functionality described herein. A representative hardware layer 1304 is illustrated and can represent, for example, any of the above referenced computing devices. In some examples, the hardware layer 1304 may be implemented according to the architecture of the computer system of FIG. 14.

The representative hardware layer 1304 comprises one or more processing units 1306 having associated executable instructions 1308. Executable instructions 1308 represent the executable instructions of the software architecture 1302, including implementation of the methods, modules, subsystems, and components, and so forth described herein and may also include memory and/or storage modules 1310, which also have executable instructions 1308. Hardware layer 1304 may also comprise other hardware as indicated by other hardware 1312, which represents any other hardware of the hardware layer 1304, such as the other hardware illustrated as part of the architecture 1302.

In the example architecture of FIG. 13, the software architecture 1302 may be conceptualized as a stack of layers where each layer provides particular functionality. For example, the software architecture 1302 may include layers such as an operating system 1314, libraries 1316, middleware layer 1318, applications 1320, and presentation layer 1344. Operationally, the applications 1320 and/or other components within the layers may invoke API calls 1324 through the software stack and access a response, returned values, and so forth illustrated as messages 1326 in response to the API calls 1324. The layers illustrated are representative in nature and not all software architectures have all layers. For example, some mobile or special purpose operating systems may not provide a middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. In some examples, the services 1330 include an interrupt service. The interrupt service may detect the receipt of an interrupt and, in response, cause the architecture 1302 to pause its current processing and execute an interrupt service routine (ISR) when an interrupt is accessed.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system 1334 libraries (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The middleware layer 1318 (also sometimes referred to as frameworks) may provide a higher-level common infrastructure that may be utilized by the applications 1320 and/or other software components/modules. For example, the middleware layer 1318 may provide various graphic user interface (GUI) functions, high-level resource management, high-level location services, and so forth. The middleware layer 1318 may provide a broad spectrum of other APIs that may be utilized by the applications 1320 and/or other software components/modules, some of which may be specific to a particular operating system or platform.

The applications 1320 includes built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1342 may invoke the API calls 1324 provided by the mobile operating system such as operating system 1314 to facilitate functionality described herein.

The applications 1320 may utilize built-in operating system functions (e.g., kernel 1328, services 1330 and/or drivers 1332), libraries (e.g., system 1334, API libraries 1336, and other libraries 1338), and middleware layer 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware computing device. A virtual machine is hosted by a host operating system (operating system 1314) and typically, although not always, has a virtual machine monitor 1346, which manages the operation of the virtual machine 1348 as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 14:
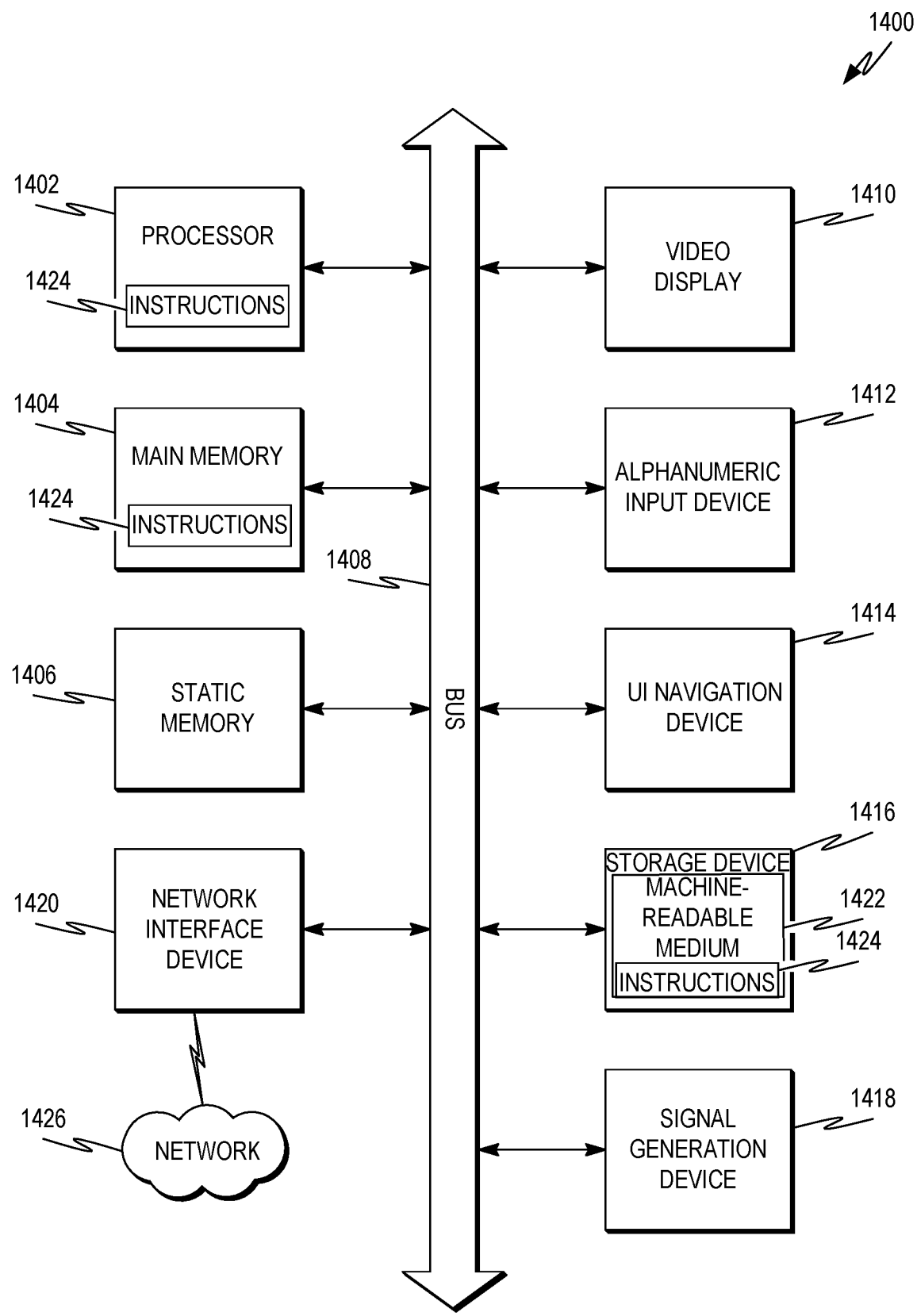
FIG. 14 is a block diagram of a machine in the example form of a computer system within which instructions may be executed for causing the machine to perform any one or more of the methodologies discussed herein.

FIG. 14 is a block diagram of a machine in the example form of a computer system 1400 within which instructions 1424 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation (or cursor control) device 1414 (e.g., a mouse), a disk drive unit 1416, a signal generation device 1418 (e.g., a speaker), and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, with the main memory 1404 and the processor 1402 also constituting machine-readable media 1422.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding, or carrying instructions 1424 for execution by the machine and that cause the machine to perform any one or more of the methodologies of the present disclosure, or that is capable of storing, encoding, or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks: magneto-optical disks: and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computing system for performing data object operations, the computing system comprising:
   at least one processor programmed to perform operations comprising:
      executing an application;
      receiving, by the application, an instruction to perform a transaction associated with a data object stored at a database management system;

initiating, by the application, execution of a transaction manager, the transaction manager to manage a transaction stream buffer; and executing a first processing pipeline for the transaction, the executing of the first processing pipeline comprising:

executing a first processing unit of the first processing pipeline, the executing of the first processing unit comprising accessing first processing unit input data from a transaction stream buffer associated with the first processing pipeline, and writing first processing unit output data to the transaction stream buffer;

initiating, by the transaction manager, a save process to write the first processing unit output data to the data object stored at the database management system; and executing, by the application, the save process, the executing of the save process comprising:

executing a pre-save operation to perform at least one check of the first processing unit output data;

executing a save operation to save the first processing unit output data to the data object; and executing a post-save operation to clear a memory location associated with the transaction stream buffer.

2. The system of claim 1, the initiating of the save process comprising executing, by the application, a save processing pipeline, the executing of the save processing pipeline comprising:

executing a save processing unit of the save processing pipeline, the save processing unit being to access the first processing unit output data from the transaction stream buffer and provide the first processing unit output data to an entity data controller associated with the data object.

3. The system of claim 2, the operations further comprising writing, by the entity data controller, the first processing unit output data to the data object stored at the database management system.

4. The system of claim 2, the executing of the save processing pipeline further comprising executing a check processing unit, the check processing unit to apply at least one verification rule to the first processing unit output data.

5. The system of claim 1, the executing of the save process further comprising executing a CRUD processing unit, the CRUD processing unit being to apply at least one modification to the first processing unit output data prior to executing the save operation.

6. The system of claim 1, the executing of the first processing pipeline further comprising, before executing the first processing unit, executing a switch processing unit, the executing of the switch processing unit comprising:

reading switch processing unit input data from the transaction stream buffer associated with the first processing pipeline;

selecting the first processing unit from a plurality of processing units associated with the first processing pipeline; and initiating the executing of the first processing unit.

7. The system of claim 1, the operations further comprising:

executing a receiver processing unit of the first processing pipeline;

receiving, by the receiver processing unit, notification data from the transaction stream buffer; and writing, by the receiver processing unit, the first processing unit input data to the transaction stream buffer associated with the first processing pipeline, the first processing unit input data being based at least in part on the notification data.

8. The system of claim 1, the executing of the first processing pipeline further comprising executing an exit processing unit, the exit processing unit to call an outside function outside of the first processing pipeline.

9. A method of performing data object operations in a computing system, comprising:

receiving, by an application executing at the computing system, an instruction to perform a transaction associated with a data object stored at a database management system;

initiating, by the application, execution of a transaction manager, the transaction manager to manage a transaction stream buffer; and executing a first processing pipeline for the transaction, the executing of the first processing pipeline comprising:

executing a first processing unit of the first processing pipeline, the executing of the first processing unit comprising accessing first processing unit input data from a transaction stream buffer associated with the first processing pipeline, and writing first processing unit output data to the transaction stream buffer;

initiating, by the transaction manager, a save process to write the first processing unit output data to the data object stored at the database management system; and executing, by the application, the save process, the executing of the save process comprising:

executing a pre-save operation to perform at least one check of the first processing unit output data;

executing a save operation to save the first processing unit output data to the data object; and executing a post-save operation to clear a memory location associated with the transaction stream buffer.

10. The method of claim 9, the initiating of the save process comprising executing, by the application, a save processing pipeline, the executing of the save processing pipeline comprising:

executing a save processing unit of the save processing pipeline, the save processing unit being to access the first processing unit output data from the transaction stream buffer and provide the first processing unit output data to an entity data controller associated with the data object.

11. The method of claim 10, the executing of the save process further comprising executing a CRUD processing unit, the CRUD processing unit being to apply at least one modification to the first processing unit output data prior to executing the save operation.

12. The method of claim 10, further comprising writing, by the entity data controller, the first processing unit output data to the data object stored at the database management system.

13. The method of claim 10, the executing of the save processing pipeline further comprising executing a check processing unit, the check processing unit being to apply at least one verification rule to the first processing unit output data.

14. The method of claim 9, the executing of the first processing pipeline further comprising, before executing the first processing unit, executing a switch processing unit, the executing of the switch processing unit comprising:

reading switch processing unit input data from the transaction stream buffer associated with the first processing pipeline;

selecting the first processing unit from a plurality of processing units associated with the first processing pipeline; and initiating the executing of the first processing unit.

15. The method of claim 9, further comprising:

executing a receiver processing unit of the first processing pipeline;

receiving, by the receiver processing unit, notification data from the transaction stream buffer; and writing, by the receiver processing unit, the first processing unit input data to the transaction stream buffer associated with the first processing pipeline, the first processing unit input data being based at least in part on the notification data.

16. The method of claim 9, the executing of the first processing pipeline further comprising executing an exit processing unit, the exit processing unit to call an outside function outside of the first processing pipeline.

17. A non-transitory machine-readable medium comprising instructions thereon that, when executed by at least one processor, cause the at least one processor to perform operations comprising:

executing an application;

receiving, by the application, an instruction to perform a transaction associated with a data object stored at a database management system;

initiating, by the application, execution of a transaction manager, the transaction manager to manage a transaction stream buffer; and executing a first processing pipeline for the transaction, the executing of the first processing pipeline comprising:

executing a first processing unit of the first processing pipeline, the executing of the first processing unit comprising accessing first processing unit input data from a transaction stream buffer associated with the first processing pipeline, and writing first processing unit output data to the transaction stream buffer;

initiating, by the transaction manager, a save process to write the first processing unit output data to the data object stored at the database management system; and executing, by the application, the save process, the executing of the save process comprising:

executing a pre-save operation to perform at least one check of the first processing unit output data;

executing a save operation to save the first processing unit output data to the data object; and executing a post-save operation to clear a memory location associated with the transaction stream buffer.

18. The medium of claim 17, the initiating of the save process comprising executing, by the application, a save processing pipeline, the executing of the save processing pipeline comprising:

executing a save processing unit of the save processing pipeline, the save processing unit being to access the first processing unit output data from the transaction stream buffer and provide the first processing unit output data to an entity data controller associated with the data object.

19. The medium of claim 18, the operations further comprising writing, by the entity data controller, the first processing unit output data to the data object stored at the database management system.

20. The medium of claim 18, the executing of the save processing pipeline further comprising executing a check processing unit, the check processing unit being to apply at least one verification rule to the first processing unit output data.

* * * * *